United States Patent Office 3,694,376
Patented Sept. 26, 1972

3,694,376
OXIDATION-REDUCTION REGENERATION OF NOBLE METAL CATALYSTS USED IN HYDROGEN PEROXIDE PRODUCTION
Gerhard E. Kabisch, 13 Schillerstrasse, Rheinfelden, Germany, and Siegfried H. Raupach, 24 Talstrasse, Beuggen, Germany
Filed July 13, 1970, Ser. No. 54,237
Claims priority, application Germany, July 12, 1969,
P 19 35 478.0
Int. Cl. B01j 11/18
U.S. Cl. 252—413       9 Claims

ABSTRACT OF THE DISCLOSURE

Palladium alone, or mixed with other metals of the platinum group on a silica containing carrier used in the hydrogenation step of the anthraquinone process for producing hydrogen peroxide is regenerated by an oxidation treatment at a pH below 7 followed by a reduction treatment at a temperature below 200° C., preferably below 150° C.

Figure 1:
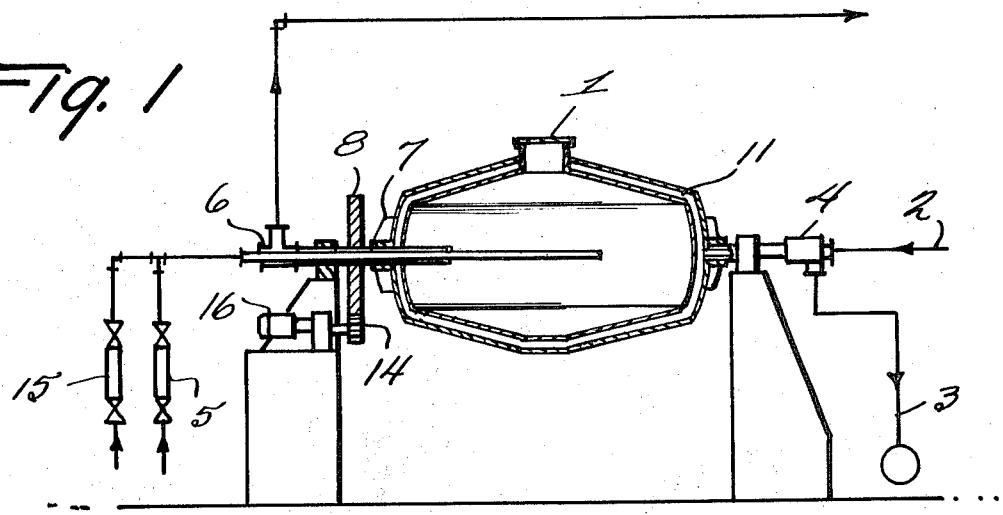

The present invention is directed to a process for the production of hydrogen peroxide by the so-called anthraquinone process with the use of regenerated noble metal carrier catalyst.

As is known in the named processes for the production of hydrogen peroxide there is primarily dissolved a quinone derivative, the so-called "reaction carrier," in a solvent and the "working solution" obtained is then hydrogenated in the presence of a catalyst to such an extent that about 50% of the quinones are converted to the corresponding hydroquinones. The hydroquinone solution is treated with an oxygen containing gas in the oxidation step whereby the quinone is reformed and at the same time hydrogen peroxide is formed. The hydrogen peroxide is washed out of the organic phase (working solution) with water. By returning the working solution to the hydrogenation step and repeating the pictured operations of hydrogenation, oxidation and extraction in a cyclic manner there is obtained a continuous process in which the hydrogenation step is the single operation which is most difficult industrially and most significant economically since it must be carried out in the presence of expensive catalysts.

In industrial plants for the manufacture of hydrogen peroxide the following hydrogenation catalysts are employed:

Raney nickel as suspension catalyst
palladium black as suspension catalyst
palladium on a carrier as suspension catalyst
palladium supported on a carrier as a fixed bed catalyst.

The anthraquinone process can only be used in industrial fashion if the expensive hydrogenation catalysts result in high productivity, have a long lifetime or are easy to regenerate. However, all of the added catalysts decrease more or less rapidly in productivity (kg. hydrogen peroxide/kg. catalyst×hour) in the continuous carrying out of the process, i.e. the activity of the catalyst in the course of time become worse. The industrial efficiency of the anthraquinone process also depends upon whether it is possible to reconvert the inactivated catalyst to an active state in an easy operation.

Many proposed porcesses have already been suggested for the reactivation of catalysts which have become inactive.

Raney nickel catalysts, according to German Pat. 1,120,432, should be reactivated by treatment with an alcoholic solution of a carboxylic acid.

In German Pat. 1,112,501 it is proposed to bring noble metal suspension catalysts (such as palladium black) into an active condition again by extraction with liquid ammonia.

Several processes have been proposed for the reactivation of carrier supported palladium-suspension catalysts. According to U.S. Pat. 2,692,240, carrier supported catalysts can be regenerated by a treatment with peroxygen compounds at a pH above 7 or according to Canadian Pat. 635,870, by an oxygen treatment at temperatures of 250–550° C.

In U.S. Pat. 2,925,391 reactivation of carrier supported palladium catalyst takes place by a treatment with non oxidizing, alkaline agents at a pH above 12 and finally the palladium catalyst on a carrier should be able to be reactivated according to U.S. Pat. 3,004,831 with an inert gas (e.g. nitrogen).

Fixed bed catalysts which contain palladium as the active catalyst according to U.S. Pat. 3,112,278 should be susceptible to regeneration by treatment with wet steam at a temperature of 80–200° C.

The usability of a hydrogenation catalyst in the anthraquinone process depends not only upon factors such as catalyst-price, -productivity, -selectivity, -life, -regenerability, etc., but especially also the industrial possibility of a quantitative separation of the catalyst from the working solution after the hydrogenation step. Decomposition of the hydrogen peroxide formed is caused in the oxidation step and the extraction step by the catalyst particles carried along from the hydrogenation step and so the industrial efficiency and safety of the entire process is questionable.

Because of the easy exchangeability of the pure metallic hydrogen catalysts (Raney nickel or palladium black) these catalysts are preferred in many large industrial plants for the production of hydrogen peroxide via the anthraquinone process. In this case the known technical difficulties in the separation of the catalyst by filtration after the hydrogenation step occur. These disadvantages do not occur in processes employing carrier supported catalysts and especially fixed bed catalysts. The catalyst exchanged in such case, however, leads to greater production interruptions, all the more by previously proposed methods for reactivation for carrier supported catalysts on whose known disadvantages can only be removed insufficiently, i.e. the regenerated catalysts no longer reach the productivity and service life of the freshly produced catalysts. Unexpectedly it has turned out that it is possible to reactivate as often as desired palladium catalysts supported on a carrier which have become ineffective in the anthraquinone process and thereby to obtain life times and productivities which are the same as those of freshly produced catalysts if the catalysts which have become ineffective in the hydrogenation step, in a given case after a pretreatment known in itself, are subjected to an oxidative treatment at a pH below 7, especially below 2 and thereafter are given a reductive treatment.

The process of the invention is concerned therefore with the production of hydrogen peroxide by the anthraquinone process with use of carrier supported catalysts which have become ineffective after use in the hydrogenation step and subsequently regenerated. These catalysts consist of (1) palladium alone or in admixture with one or more of the remaining metals of the platinum group such as ruthenium, rhodium, osmium, platinum and iridium, as the active catalyst portion and (2) silicon dioxide containing carriers, in which the catalysts used, in a given case after a pretreatment, are subjected to an oxidative treatment at a pH below 7 followed by a reductive treatment. When another metal of the platinum group is present it is used in an amount of 0.1 to 30% of the total of palladium and said other metal of the platinum group.

Unless otherwise indicated all parts and percentages are by weight.

The process is useful in reactivating palladium catalysts on silicon dioxide containing carriers which have been used in the hydrogenation step of the anthraquinone process wherein as the quinone there has been employed any of the conventional alkyl anthraquinone such as 2-methyl anthraquinone, 2-ethyl anthraquinone, 2-butyl anthraquinone, 2-isopropyl anthraquinone, 2-amyl anthraquinone, 2-sec butyl anthraquinone, 2-t-butyl anthraquinone, 2-sec amyl anthraquinone, 1,3-dimethyl anthraquinone, 2,3-dimethyl anthraquinone, 1,4-dimethyl anthraquinone, 2,7-dimethyl anthraquinone, and their partially nuclear hydrogenated derivatives, e.g. the tetrahydro anthraquinones such as 2-ethyl tetrahydro anthraquinone.

The regenerated catalysts used in the process of the invention contain as the active metal in major amount palladium, which preferably is present in a concentration below 1 weight percent, usually 0.05 to 0.5 weight percent, based on the total weight of the catalyst and carrier.

As inert carriers there can be used materials which are essentially unattacked under the reaction conditions and possess a BET surface area below 50 m.$^2$/g., usually 0.001 to 0.5 m.$^2$/g. Particularly the carrier material should have a silicon dioxide content over 5% (preferably over 50%). The carrier can be added unformed or formed, for example as packing (Raschig rings, Berl saddles, balls, etc.) extrusion pressed objects or tablets. The size of the catalyst carrier has no role in the reactivation, i.e. it can be used again with the process of the invention in regenerated form just as well if charged as small catalyst particles (granule size about 20–100 microns) as a carrier for suspension catalysts or as large catalyst particles (granule size 1–10 mm.) which find use as a fixed bed catalyst in the anthraquinone process.

The oxidizing acting mixtures in the pH region below 7 should be volatile up to 150° C. or form transformation products volatile at temperatures up to 150° C. These types of media are for example:

Gaseous chlorine=hydrogen chloride mixtures (e.g. those containing 40 to 70 mol percent chlorine);
Hydrogen peroxide mixed with hydrochloric acid (e.g. a mixture of 10 to 20 weight percent hydrogen peroxide, 10 to 20 weight percent hydrogen chloride and 60 to 80 weight percent water);
Nitric acid in admixture with hydrochloric acid (10 to 25 weight percent $HNO_3$, 20 to 35 weight percent HCl and 40 to 70 weight percent water).

The mixture volatile up to 150° C. has the function to convert the palladium (or the palladium containing metal) as quantitatively as possible into its salts without attacking the carrier material. The concentration and amount of acidic oxidizing mixture are so selected that they are at least sufficient for salt formation, for example if one works with gaseous mixtures, the introduction of gas can be stopped when the carrier material is uniformly coated with the metal salt. When an oxidizing acting acid liquid is employed the amount of liquid is so measured that a complete wetting and salt formation is guaranteed. In this way there is avoided the catalyst charge becoming nonhomogeneous in the subsequently carried out reduction or drying process and the resulting impractically long reaction times. Then the metal salts arising which are precipitated on the carrier are again converted to the active metal. This can be accomplished by the indicated reduction operation in known manner in the dry way (for example with a hydrogen containing gas) or in the wet way (for example with formic acid, formaldehyde, hydrazine). In the last case a renewed drying of the reactivated catalyst is necessary so that the dry method of reduction is preferred. The catalysts to be used in the production of hydrogen peroxide are regenerated in various apparatuses which are either themselves made of corrosion resistant materials or are coated therewith. As corrosion resistant materials there are understood those which are not attacked by the mentioned oxidizing acting acid media and the noble metal salt solutions. As metallic material only the relatively expensive metals such as tantalum are suited which are nobler in the electromotive series than the metal precipitating on the carrier. Therefore apparatus provided with corrosion resistant coating are preferred. Preferred coatings are synthetic resins (such as Teflon (polytetrafluoroethylene), polyesters, i.e. cross linked polyesters phenol-formaldehyde resins, etc.) or enamels. The individual process steps belonging to the reactivation process:

(1) Pretreatment.
(2) Conversion of the inactive metal into its salt.
(3) Reduction (and drying) can be carried out individually in separate apparatuses. Thus, for example, the pretreatment of the inactive carrier supported catalyst with steam can take place in the apparatus in which the catalystic reaction takes place. The pretreeated catalyst can then be treated with the oxidizing acting acid medium, for example on a rotary plate provided with a fume hood, and subsequently the reduction carried out in a further apparatus (tower, furnace, etc.).

The conversion, reduction and drying of the exhausted catalyst from the hydrogen step can take place in a technically very simple apparatus. The named operations can be carried out single stage in customary heatable rotary drums, double cone driers, tumbling driers, etc. if they are provided with corrosion resistant coatings and in addition are fitted with openings (for example catalyst filling openings, thermometer openings) with rotary journaled gaskets. If the heating of the rotating apparatus takes place electrically (for example with slip ring contacts) then it is sufficient if the rotating apparatus is provided with an individual journaled gasket for the gas inlet and gas outlet. If the heating of the rotating apparatus takes place by a heating agent (for example, steam) then two cone gaskets are necessary (one for the gas inlet and outlet and the other for heating agent inlet and outlet).

Figure 2:
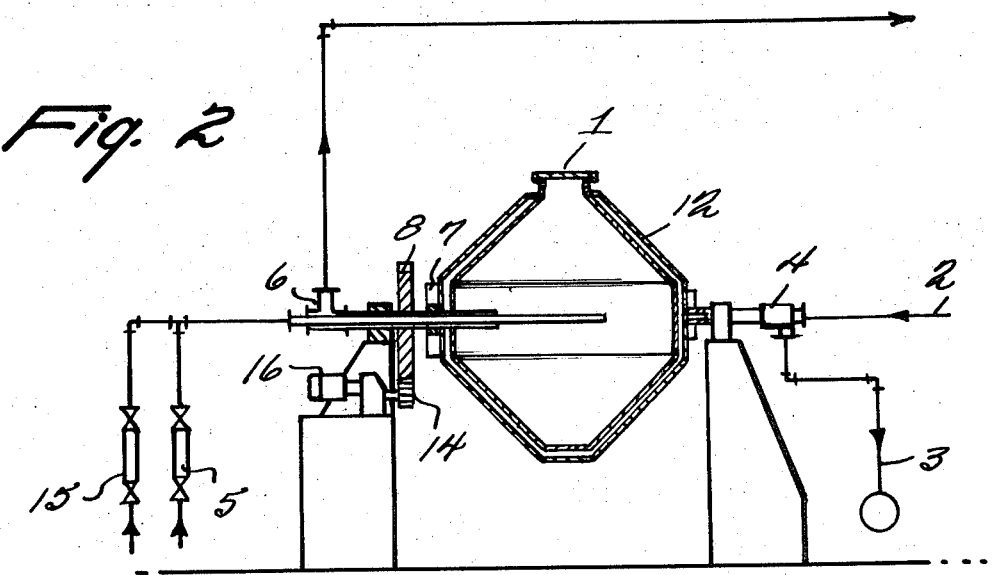

The invention in this form will be understood best in connection with the drawings wherein:

FIG. 1 is a schematic illustration of one rotating apparatus heated with steam for carrying out the invention; and FIG. 2 is a schematic illustration of a slightly modified apparatus.

Referring more specifically to the drawings 1 indicates an opening for filling or emptying (for the catalysts and reactivation solutions) in the rotating apparatus 11 (FIG. 1) or 12 (FIG. 2).

The entrance of steam to heat the jacket is through conduit 2 and the condensate runs off through conduit 3 leading from the packing gland 4, which for example is a customary stuffing box. The necessary gases for the reactivation (as inert gases, chlorine, hydrogen chloride and hydrogen) are introduced by way of flow meters 5 and 15 into the rotating apparatus. The waste gases leaving the rotating apparatus via conduit 6 can be cooled, purified or absorbed in subsequently added equipment (not shown). Also the packing gland for the gas inlet and outlet can consist of a customary automatic stuffing box 7. The driving of the apparatus takes place for example by way of variable speed gear 8 connected through pinion gear 14 which is driven by motor 16.

The pressure at which the reactivation of the invention is carried out can vary in a wide range. It can be for example between a vacuum and 6 atmospheres absolute, preferably between normal pressure and two atmospheres absolute. Also the temperatures used in the reactivation can vary in a wide range if the materials employed withstand the temperature conditions. A temperature between 20 and 200° C. is preferred, preferably between 40 and 150° C.

The process of the invention is especially well suited for use with the fixed bed catalyst specific working form of the anthraquinone process. By the easy reactivability of the fixed bed catalyst in the process of the invention there results increased economical improvement of the total characteristically cyclic process of the anthraquinone process. Under the fixed bed catalytic agents such catalysts have an especially high activity and selectivity (reduced by product formation), which possess a smaller BET surface area. Surprisingly it has been proven that these catalysts are easily accessible to the reactivation of the invention if the carrier support for the catalyst consists of a silicon dioxide containing material. In the hydrogenation tower of an anthraquinone plant exhausted fixed bed catalyst can be quickly exchanged by reactivating the catalyst with only short breaks in production. If no breaks in operation are permitted then it is recommended that the operation be carried with two parallel inserted towers, whereby the towers are alternately used in the operation. The contents of the tower not in operation are continuously reactivated.

The mode of operation designated as pretreatment has often proven advantageous to remove the main amount of the working solution adsorbed on the catalyst which has become inactive. The pretreatment comprises operations such as:

Water washing the carrier supported catalyst,
Steam treatment of the carrier supported catalyst,
Extraction of the catalyst with organic solvents (for example acetone, isopropanol, trichloroethylene and the like),
Drying the carrier supported catalyst at temperatures below 200° C., etc.

EXAMPLE 1

In the hydrogenation step of the anthraquinone process for the production of hydrogen peroxide (employing 2-ethyl anthraquinone as the quinone) there was employed a catalyst which consisted of 0.2% palladium precipitated on filter gravel (silica) having a particle size of several millimeters. This fixed bed catalysts showed in the anthraquinone process an initial productivity of 26 kg. $H_2O_2$/kg. Pd×h. In the course of a 3 months time of operation the productivity fell finally to a value of 13 kg./$H_2O_2$/kg. Pd×h. The catalyst was thereupon discharged, freed of adhering organic constituents by exhaustive extraction with 1,1,1-trichloroethane and in 1.6 metric ton charges filled into a rotating drum 1 clad with a synthetic resin as is shown in FIG. 1. The rotating drum was heatable with steam at 6 atmospheres absolute in the jacket. The catalyst in the drum was sprayed with 20 liters of a 15% aqueous hydrochloric acid solution and with 5 liters of a 60% aqueous hydrogen peroxide solution. After closing of the drum and introduction of the steam heating the drum was set in rotation (4 revolutions per minute) and a nitrogen stream (3 $Nm.^3$/h.) introduced to the contents of the drum over stuffing box 7. After ½ hour the contents of the drum had reached a temperature of 100° C. and in an additional 2 hours the filter gravel now coated with $PdCl_2$ were dried and had a temperature of 110° C. At this temperature there were next introduced 3 $Nm.^3$/h. of nitrogen and in addition thereto for 2 hours an amount of 4 $Nm.^3$/h. of hydrogen until the initially brown coating of the gravel had taken on the velvety black palladium color. After a further 1 hour nitrogen flushing the drum contents were emptied. The reactivated catalyst shows an initial productivity of 26 kg. $H_2O_2$/kg. Pd×h. and a service life during the operation which was not different from that of fresh catalyst. Also the abrasive resistance of the catalyst was not influenced by the reactivation.

The above described reactivation was repeated altogether 3 times without a deterioration of the catalyst constant being noticeable.

EXAMPLE 2

A catalyst which had become inactivated as in Example 1 was treated with steam to remove adhering organic constituents. The still wet catalyst next was filled in 1.6 metric ton charges into the rotating drum according to Example 1 and treated there under rotation (2 r.p.m.) at a temperature of 85° C. for 3 hours with a $HCl/HCl_2$ gas mixture (0.7 $Nm.^3Cl_2$/h. and 0.8 $Nm.^3HCl$/h.). At the same temperature the drum was then flushed with nitrogen and after that the catalyst reduced with hydrogen as in Example 1 except at a temperature of 85° C.

The catalyst reactivated in this manner upon renewed addition to the hydrogenation step of the anthraquinones process did not differ in its constants (productivity, service time, abrasion resistance) from those of a freshly produced catalyst.

What is claimed is:
1. In a process for the regeneration of a catalyst consisting of palladium alone or in admixture with another metal of the platinum metal group of the periodic table as the active metal supported on a silica containing carrier, said catalyst having been exhausted in the hydrogenation step of the continuous process for the production of hydrogen peroxide by the anthraquinone process the improvement comprising subjecting said exhausted catalyst to an oxidative treatment at a pH below 2 with either (1) a chlorine-hydrogen chloride gas mixture or (2) a mixture of hydrogen peroxide and a strong mineral acid and forming a coating of palladium salt on the silica carrier by said treatment and then subjecting the thus coated silica carrier to a reductive treatment with a hydrogen containing reducing gas below 200° C. to regenerate said catalyst.

2. A process according to claim 1 wherein the exhausted catalyst prior to the oxidative treatment is pretreated by (1) water washing, (2) steam, or (3) organic solvent extraction to remove organic constituents of the anthraquinone process adsorbed thereon.

3. A process according to claim 1 wherein the oxidative treatment is carried out with reagents volatile at a temperature not over 150° C.

4. A process according to claim 3 wherein the oxidative treatment is carried out with a chlorine-hydrogen chloride gas mixture.

5. A process according to claim 3 wherein the oxidative treatment is carried out with a mixture of hydrogen peroxide and a strong mineral acid.

6. A process according to claim 5 wherein the mineral acid is hydrochloric acid.

7. A process according to claim 3 wherein the oxidative treatment is carried out either with a gaseous mixture of chlorine and hydrogen chloride or an aqueous mixture of hydrogen peroxide and hydrochloric acid.

8. A process according to claim 7 wherein the catalyst is reactivated at a temperature between 20 and 200° C.

9. A process according to claim 8 wherein the catalyst is reactivated at a temperature between 40 and 150° C.

References Cited

UNITED STATES PATENTS

| | | | |
|---|---|---|---|
| 3,016,354 | 1/1962 | Hindin et al. | 252—413 |
| 3,488,295 | 1/1970 | Sennewald et al. | 252—413 |
| 2,940,833 | 6/1960 | Le Feuvre et al. | 23—207 |
| 2,692,240 | 10/1954 | Sprauer | 252—413 |

FOREIGN PATENTS

| | | | |
|---|---|---|---|
| 922,021 | 3/1963 | Great Britain | 252—415 |

DANIEL E. WYMAN, Primary Examiner

P. E. KONOPKA, Assistant Examiner

U.S. Cl. X.R.

23—207, 288 B, 288 E; 252—415, 416